Sept. 29, 1925.
B. E. MASSA
1,555,139
APPARATUS FOR ICING PASSENGER AND FREIGHT CARS
Filed Nov. 20, 1924
2 Sheets-Sheet 2

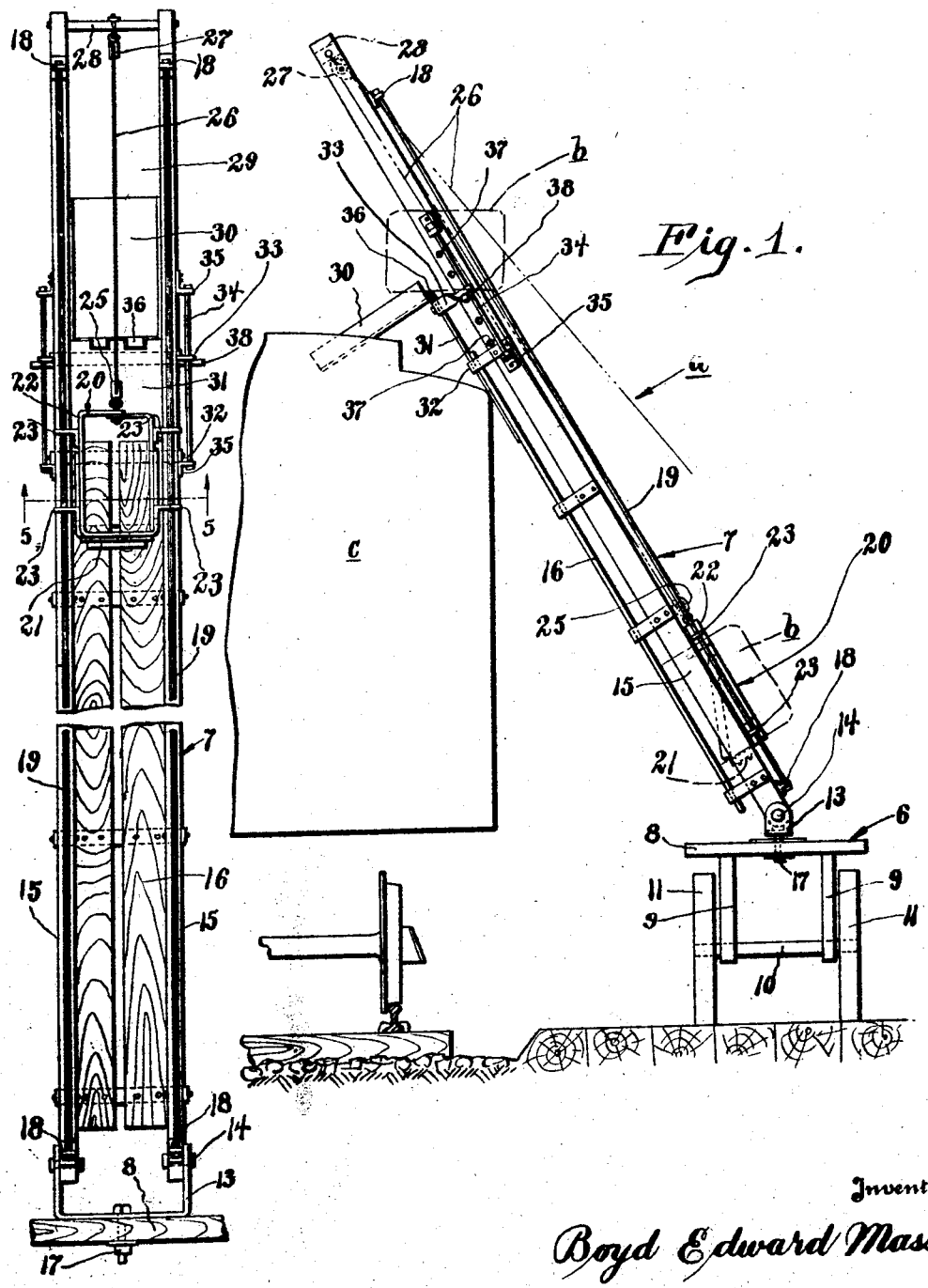

Inventor
Boyd Edward Massa
By Lyon & Lyon
Attorneys

Patented Sept. 29, 1925.

1,555,139

UNITED STATES PATENT OFFICE.

BOYD EDWARD MASSA, OF NEEDLES, CALIFORNIA.

APPARATUS FOR ICING PASSENGER AND FREIGHT CARS.

Application filed November 20, 1924. Serial No. 751,018.

*To all whom it may concern:*

Be it known that I, BOYD EDWARD MASSA, a citizen of the United States, residing at Needles, in the county of San Bernardino and State of California, have invented a new and useful Apparatus for Icing Passenger and Freight Cars, of which the following is a specification.

This invention relates to apparatus for icing passenger and freight cars, and an object of the invention is to provide an apparatus of this type that can be moved from car to car and placed in position for use and thrown out of such position very quickly so that little time is lost in making the necessary preparation to discharge ice into the various cars of a train.

Another object is to make providsion for quick adjustment of the apparatus to suit cars of different heights.

A further object is to provide an apparatus of this type having an elevator that can be swung laterally in relation to the truck upon which it is mounted so that the elevator can be extended laterally from the truck in the position to discharge the ice into the ice bunkers of the car and so that the elevator can be also positioned longitudinally of the truck when the apparatus is not in use.

Other objects and advantages will appear in the subjoined detailed description.

The accompanying drawings illustrate the invention:

Fig. 1 is an elevation of an apparatus for icing passenger cars constructed in accordance with the provisions of this invention, a fragment of the car being indicated in position for receiving ice from the elevator and blocks of ice being indicated on the elevator.

Fig. 2 is an enlarged longitudinal view of the elevator looking in the direction of the arrow *a* in Fig. 1.

Figure 3:
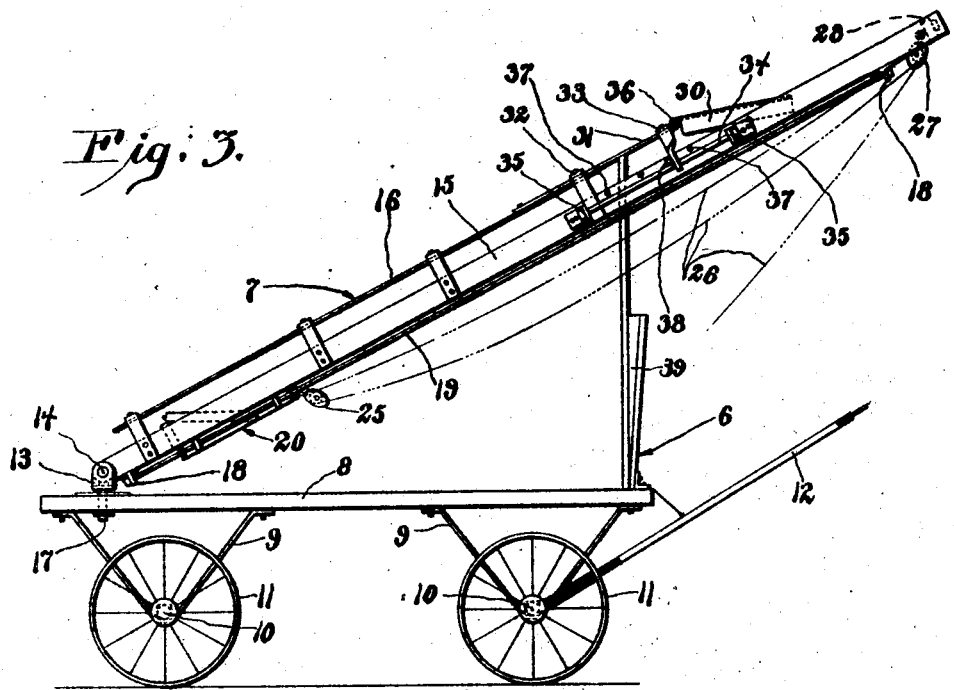
Fig. 3 is a side elevation of the apparatus with the elevator folded upon the truck.
Figure 4:
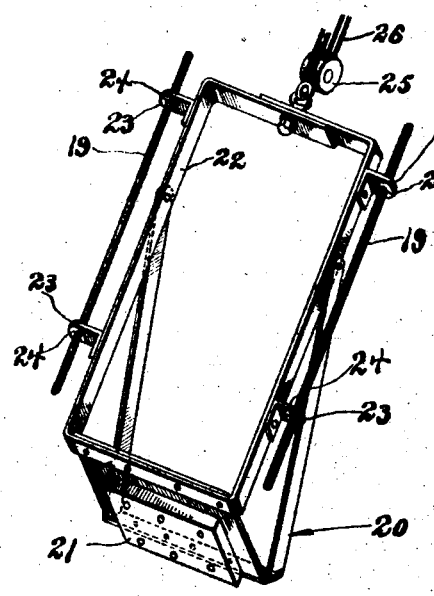
Fig. 4 is a perspective view of the elevator bucket.
Figure 5:
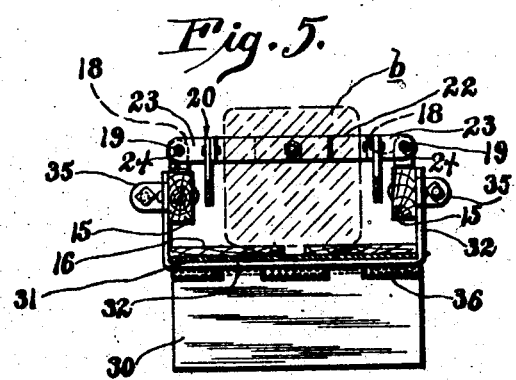
Fig. 5 is an enlarged sectional elevation on the line indicated by 5—5, Fig. 2.

The apparatus comprises a truck 6 of any suitable construction and an elevator 7 pivotally mounted on the truck so that the elevator can be folded bottom side up on the truck as in Fig. 3, and also swung in a vertical plane over its pivotal connection from folded position into position for use, as in Fig. 1.

The truck 6 comprises a suitable platform 8 connected by supports 9 to axles 10 upon which are mounted wheels 11. The truck is of the type employed at railroad stations for handling baggage and is provided with a tongue 12 by which it may be drawn from place to place. Cakes of ice to be elevated by the apparatus may be carried on the platform 8.

The platform 8 is provided near one end with a swivel 13 which turns about a vertical axis and pivoted at 14 to the swivel 13 is the lower end of the frame of the elevator. The frame in this instance comprises sides formed by strips 15 and a floor or bottom 16 which is considerably shorter than the side strips. The pivots 14 pass through the lower ends of the sides 15 and also through the upright legs of the swivel 13 which is U-shaped. The pivot of the swivel 13 is indicated at 17.

Mounted near opposite ends on the sides 15 are brackets 18 which support guides 19 in the form of rods of circular cross section that are parallel with the sides and spaced by the brackets 18 from the upper edges of said sides when the elevator is in position for use, as in Fig. 1.

The elevator also comprises a bucket 20 which is slidably mounted on the guides 19, The bucket 20, in this instance, comprises an end or pusher member 21 against which the cake of ice, indicated at *b* in Fig. 1, is adapted to rest, and a frame 22 connected with the end member 21. The member 21 slides the cake of ice along the bottom 16. The frame 22 has outstanding ears 23 provided with holes 24 through which the guides 19 pass. The end of the frame 22 most remote from the end member 21 is provided with a pulley block 25 which is connected by a tackle member 26 to a second pulley block 27 secured to a cross bar 28 that connects the upper ends of the sides 15. A pull on the tackle member 26 causes the bucket 20 to ride upwardly along the guides 19 and gravity will return the bucket to the lower ends of the guides when the tackle member is released.

It has heretofore been stated that the floor 16 is shorter than the sides 15. This produces an opening 29 in the elevator between the upper portions of the sides, and the bucket operates over this opening as well as over the floor 16 so as to slide the cake of ice upwardly along the floor 16 and discharge said cake through the opening 29.

A chute 30 is provided to receive the cake of ice, the outer end of said chute being adapted to project into the ice-receiving opening of the ice bunker of the car *c* which is to be iced. The chute 30 is adjustably connected to the elevator. The mounting of the chute 30 admits of two different adjustments, an angular adjustment relative to the elevator and also an adjustment longitudinally of the elevator. The construction relied upon to effect this is as follows:

The floor or bottom 16 of the elevator is extensible, the sliding section of said bottom being indicated at 31. The sliding section 31 slides through a U-shaped guide 32 secured to the sides 15 and a U-shaped guide 33 secured to the section 31 engages guides 34 which, in this instance, are in the form of rods of circular cross section. The upposite ends of the guides 34 are connected to the sides 15 by brackets 35 which space the guides 34 outwardly from the sides 15.

The chute 30 is pivoted at 36 to the adjustable bottom section 31 and, in order to hold said section 31 in different positions to which it may be adjusted lengthwise of the elevator, each side 15 is provided with a series of sockets 37 into which a pin 38 may be selectively placed so as to form abutments to support the slide 33.

To support the elevator in an inclined position, when it is folded upon the truck, the truck is provided with a standard 39, the upper end of which is adapted to be engaged by the elevator bottom 16 when the elevator is swung into position over the standard with the bottom uppermost as in Fig. 3.

The invention operates as follows: Assuming that the elevator is in the folded position illustrated in Fig. 3, the truck 6 will be drawn to position the car approximately opposite to the opening of the ice bunker and the operator will raise the elevator from the standard 39 into vertical position and will then lower the elevator until the elevator rests against the car. In raising and then lowering the elevator it will be swung from one side of the pivot 14 to the opposite side, thus bringing the bottom 16 to a position beneath the bucket. Then the elevator will be turned to a position approximately at a right angle to the truck and leaning against the car *c*.

The operator will adjust the bottom section 31 to give the proper slant to the chute 30 for discharging the ice into the ice bunker, positioning the pins 38 in the appropriate sockets 37 so as to maintain the bottom section 31 in the adjusted position. The various parts will then be in the positions shown in Fig. 1 with the bucket 20 positioned just above the truck platform 8.

The cakes of ice *b* will then be placed on the elevator within the bucket 20 and the operator will operate the tackle member 26 so as to slide the cake of ice upwardly along the elevator bottom 16. The cake of ice will slide from the stationary portion of the bottom onto the movable section 31 and will then discharge from said movable section through the opening 29 upon the chute 30 whence it slides into the ice bunker. The operator then lowers the bucket and after placing a cake of ice therein, operates it as before. These operations will be continued until the desired quantity of ice is placed in the bunker.

After the bunker is filled, a man on top of the car will support the upper end of the elevator and walk along the eaves of the car and onto the next car while the truck is rolled into position adjacent to said next car.

It is to be noted that the pivot 14 and swivel 13 with its pivot 17 constitute a universal connection between the elevator and the truck, thus enabling the elevator to be rested firmly against the car, even though the truck is not exactly parallel to the car. It is also to be observed that by swiveling the elevator to the truck, the elevator may be turned to position at right angles to the length of the truck so that the truck will remain stationary and properly support the elevator when said elevator is in position for elevating ice and discharging it into the ice bunker of the car.

I claim:

1. An apparatus for icing passenger and freight cars comprising a truck, an elevator mounted on the truck and provided with a bottom on which the ice is adapted to slide, there being an opening in the elevator, and a chute hingedly connected with the bottom adjacent to said opening.

2. An apparatus for icing passenger and freight cars comprising a truck, an elevator mounted on the truck and provided with a bottom on which ice is adapted to slide, there being an opening in the elevator, and a chute slidably connected with the bottom adjacent to the opening.

3. An apparatus for icing passenger and freight cars comprising a truck, an elevator mounted on the truck and provided with a bottom having a sliding section, means to hold the sliding section in different positions, there being an opening in the elevator, and a chute connected to the sliding section below the opening.

4. An apparatus for icing passenger and freight cars comprising a truck, an elevator mounted on the truck and provided with a bottom having a sliding section, means to hold the sliding section in different positions, there being an opening in the elevator, and a chute hingedly connected to the sliding section below the opening.

5. An apparatus for icing passenger and freight cars comprising a truck, an elevator mounted on the truck and provided with a bottom having a sliding section, and means to hold the sliding section in different positions, there being an opening in the elevator, and the elevator having means to slide a cake of ice upon the sliding bottom section to the opening.

6. An apparatus for icing passenger and freight cars comprising a truck, an elevator mounted on the truck and provided with a bottom having a sliding section, means to hold the sliding section in different positions, there being an opening in the elevator and the elevator having means to slide a cake of ice upon the sliding bottom section to the opening, and a chute hingedly connected to the sliding section beneath the opening.

7. An apparatus for icing passenger and freight cars comprising a truck, a swivel on the truck having a vertical pivot, an elevator, and horizontal pivot connecting one end of the elevator to the swivel so that the elevator can be turned either right side up or bottom side up.

8. An apparatus for icing passenger and freight cars comprising a truck having a standard near one end and a swivel near its opposite end, and an elevator pivotally connected at one end with the swivel so that the elevator can be turned right side up or bottom side up.

Signed at Needles, California, this 4th day of November, 1924.

BOYD EDWARD MASSA.